United States Patent
Duan et al.

(10) Patent No.: US 8,861,223 B2
(45) Date of Patent: Oct. 14, 2014

(54) ELECTRONIC DEVICE WITH CONNECTING ASSEMBLIES

(71) Applicants: Ju-Ping Duan, Shenzhen (CN); Ming-Fu Luo, Shenzhen (CN)

(72) Inventors: Ju-Ping Duan, Shenzhen (CN); Ming-Fu Luo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 192 days.

(21) Appl. No.: 13/632,290

(22) Filed: Oct. 1, 2012

(65) Prior Publication Data

US 2013/0182378 A1    Jul. 18, 2013

(30) Foreign Application Priority Data

Jan. 13, 2012   (CN) .......................... 2012 1 0009593

(51) Int. Cl.
*H05K 7/02* (2006.01)
*H05K 7/04* (2006.01)

(52) U.S. Cl.
USPC ..... 361/809; 361/807; 361/679.01; 248/27.1; 439/296; 439/297

(58) Field of Classification Search
CPC ............................ H01R 13/74; H01R 2201/06
USPC ........ 361/679.37, 679.01, 807, 809; 439/296, 439/297, 382; 248/27.1
See application file for complete search history.

(56) References Cited

U.S. PATENT DOCUMENTS

| | | | |
|---|---|---|---|
| 7,614,132 B2 * | 11/2009 | Heirich | 29/469 |
| 8,319,135 B2 * | 11/2012 | Chen et al. | 200/547 |
| 8,345,416 B2 * | 1/2013 | Liang et al. | 361/679.31 |
| 8,435,054 B2 * | 5/2013 | Liu | 439/142 |
| 8,542,482 B2 * | 9/2013 | Hsiung | 361/679.3 |
| 8,634,208 B2 * | 1/2014 | Duan et al. | 361/807 |
| 8,644,032 B2 * | 2/2014 | Liang et al. | 361/807 |

* cited by examiner

*Primary Examiner* — Lisa Lea Edmonds
*Assistant Examiner* — Keith Depew
(74) *Attorney, Agent, or Firm* — Novak Druce Connolly Bove + Quigg LLP (57) ABSTRACT

An electronic device includes a housing and at least one connector assembly. The housing includes a bottom wall and a sidewall. The sidewall includes an outer side surface, a top surface and an inner side surface. At least one insertion interface is defined through the outer side surface. One resisting groove is defined on each end wall of the insertion interface. The top surface forms at least one receiving groove communicating with the corresponding insertion interface. Each connector assembly includes a connecting member and a connector. The connecting member includes a main body and two positioning ends protruding from the main body. The main body is received in the receiving groove. Each positioning end passes through the receiving groove and extends into the insertion interface to resist a side wall of one resisting groove. The connector is received in the insertion interface and resists between the two positioning ends.

10 Claims, 7 Drawing Sheets

ELECTRONIC DEVICE WITH CONNECTING ASSEMBLIES

BACKGROUND

1. Technical Field

The present disclosure generally relates to electronic devices, and particularly to an electronic device having connector assemblies for transmitting data with other electronic devices.

2. Description of Related Art

Electronic devices, such as mobile phones, tablet computers, and media players, may have several connecting interfaces for inserting connectors of external devices for the transmission of data. Universal Serial Bus (USB) connectors are one of the most current connectors available. Support modules are positioned in the electronic devices and are electrically connected to the USB connecters. A USB connector positioned in the electronic device will be electrically connected to the support module via a connecting port positioned on the housing. It may be difficult to accurately position the connecting port in an electronic device because of the small size and reduced height of the connecting port. In addition, the USB connector is easily loosened because of the space between the USB connector and one corresponding connecting interface being proportionate. A male connector of an external electronic device may be difficult to be coupled with the female USB connector.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
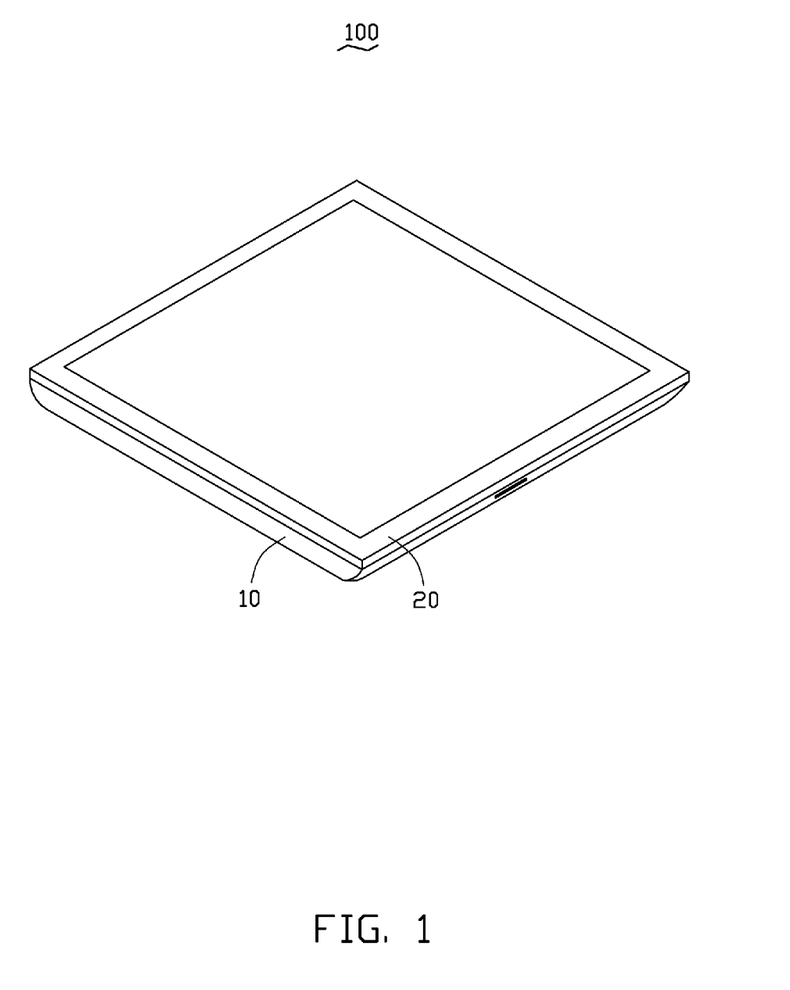
FIG. 1 shows an isometric view of an embodiment of an electronic device.
Figure 2:
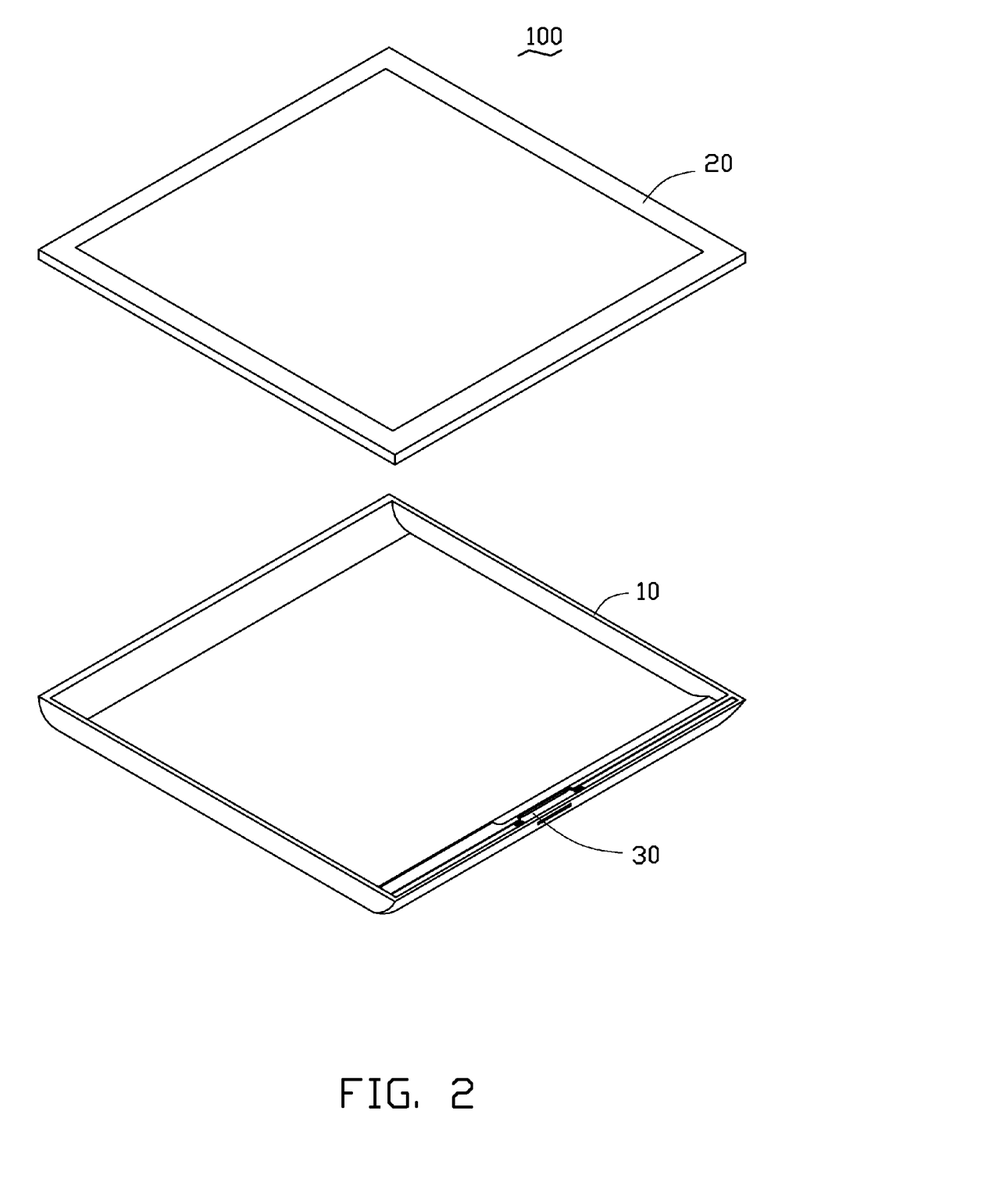
FIG. 2 shows an exploded isometric view of the electronic device of FIG. 1 having a housing and a connector assembly.

Referring to FIGS. 1 and 2, an embodiment of an electronic device 100 is shown. The electronic device 100 includes a housing 10, a cover 20 covered on the housing 10 and a connector assembly 30 mounted at the housing 10. In the illustrated embodiment, the electronic device 100 is a tablet computer. The electronic device 100 also includes various other functional modules for performing specific functions which are not described herein for the sake of simplicity.

Figure 3:
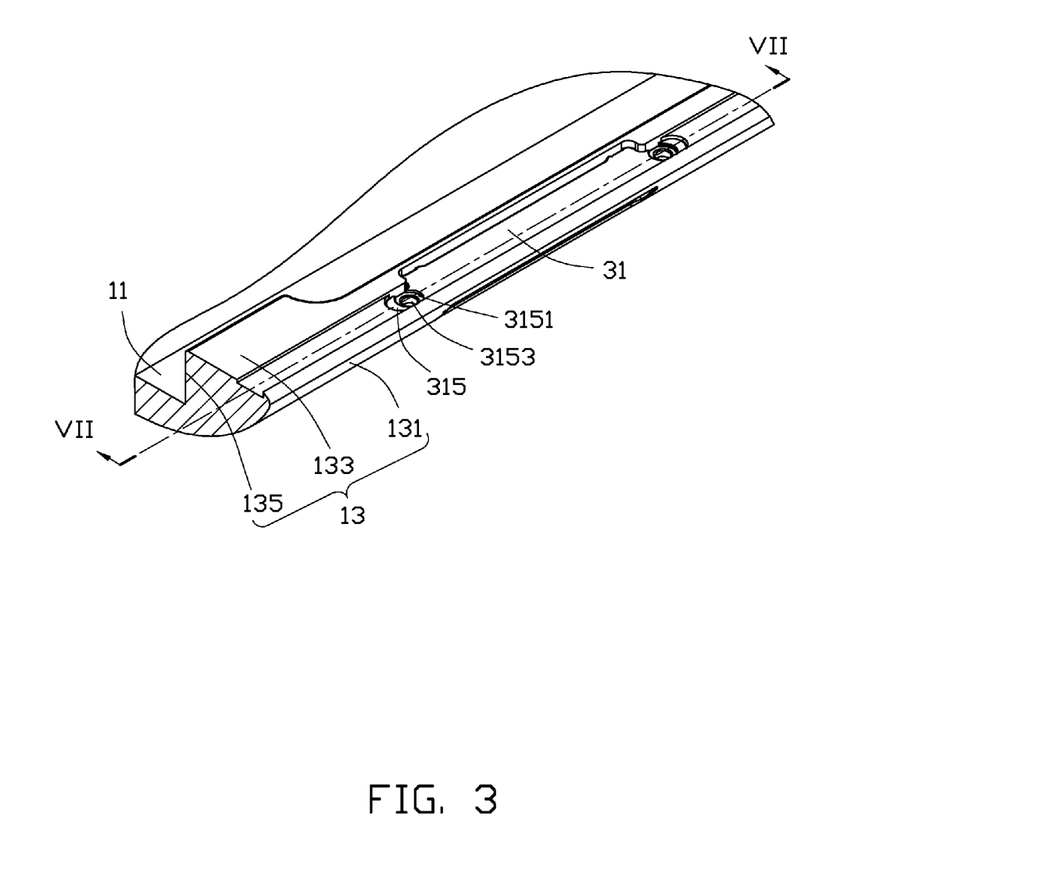
FIG. 3 shows a partial and enlarged view of the connector assembly assembled with the housing of the electronic device of FIG. 2.
Figure 4:
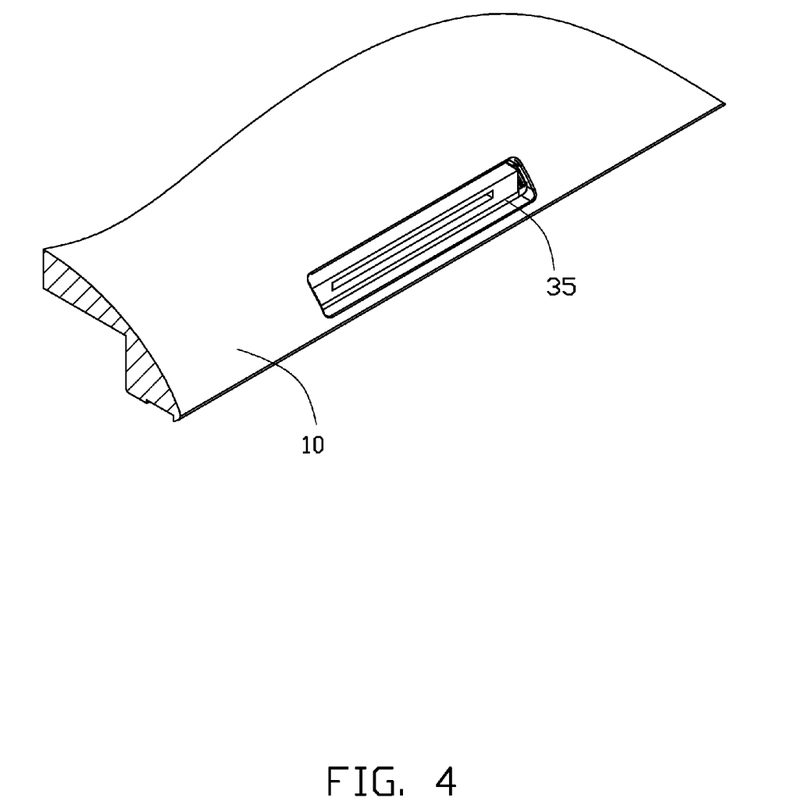
FIG. 4 is similar to FIG. 3, but viewed from another aspect.
Figure 5:
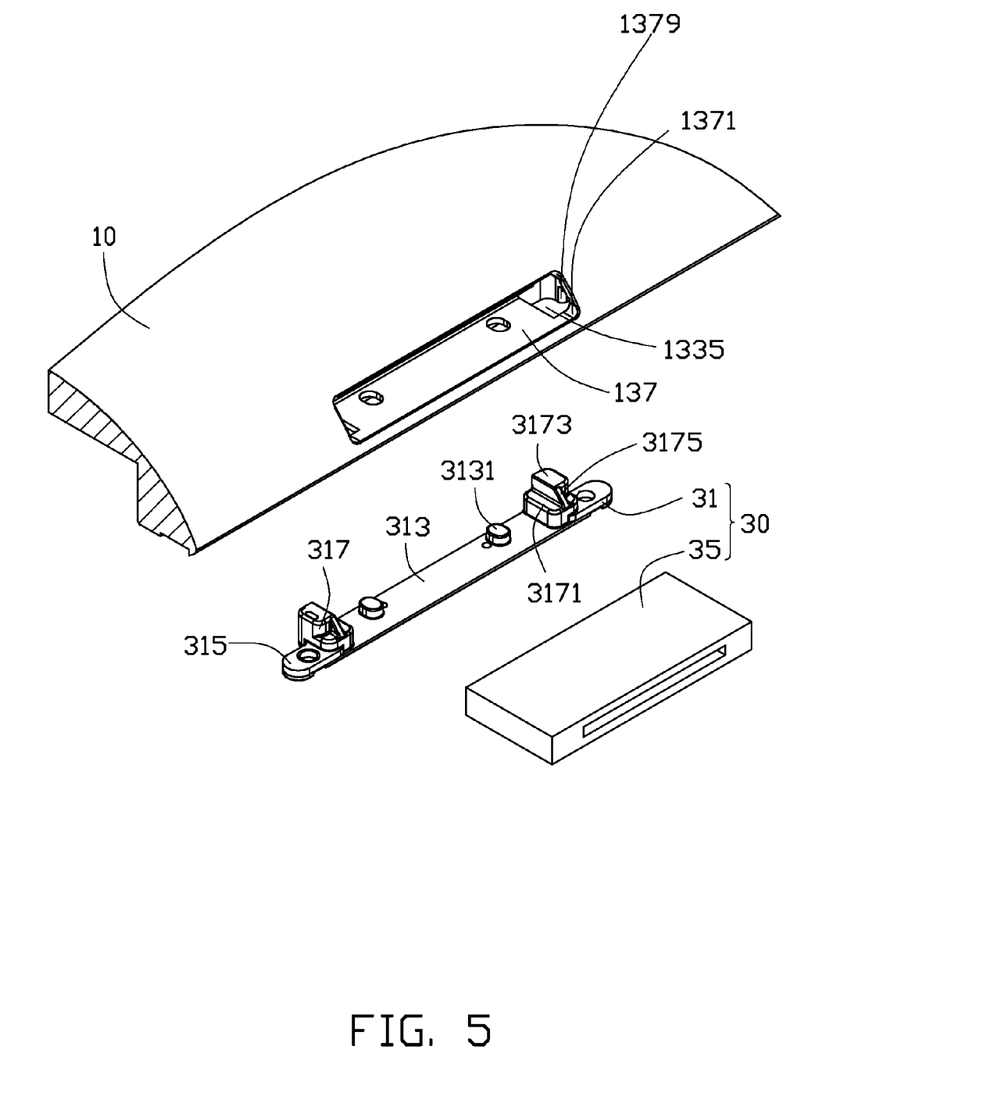
FIG. 5 shows an exploded view of the electronic device of FIG. 4.

Also referring to FIG. 3 through FIG. 5, the housing 10 is a hollow structure. The housing 10 includes a bottom wall 11 and a sidewall 13 extending from edges of the bottom wall 11. The sidewall 13 includes an outer side surface 131, a top surface 133 and an inner side surface 135. The top surface 133 connects with the outer side surface 131 and the inner side surface 135. The outer side surface 131 is a smooth curved surface. The top surface 133 is a planar surface. The top surface 133 is parallel to the bottom wall 11.

Figure 6:
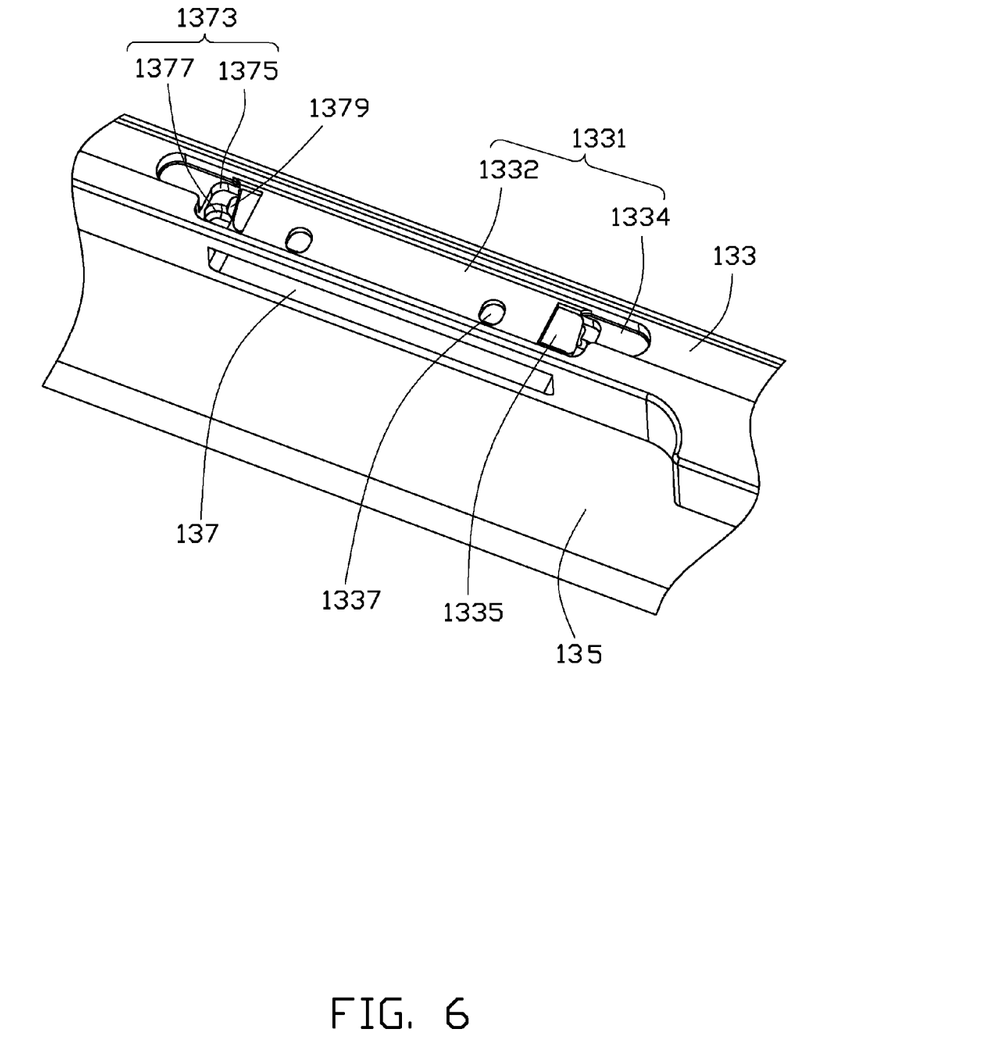
FIG. 6 shows a partial and enlarged view of the housing of the electronic device of FIG. 3.
Figure 7:
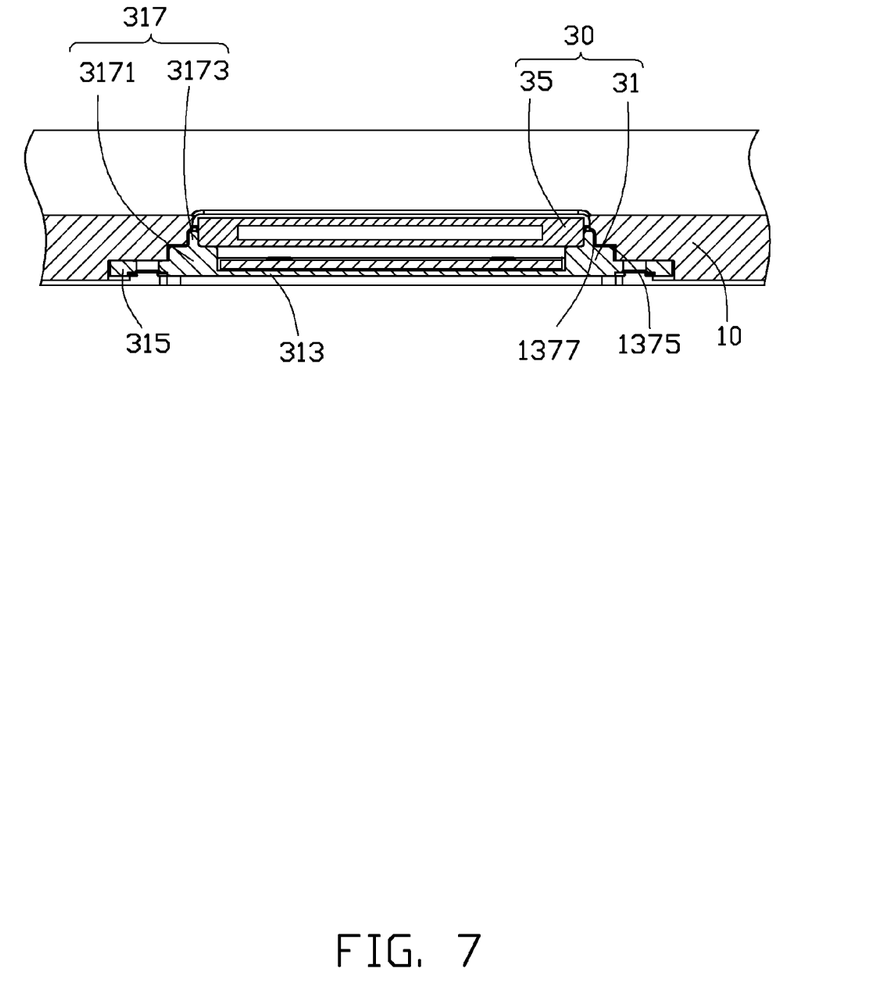
FIG. 7 shows a sectional view of the connector assembly of FIG. 3 taken along the direction of VII-VII.

Also referring to FIGS. 6 and 7, an insertion interface 137 is defined through the outer side surface 131 and the inner side surface 135, respectively. The insertion interface 137 is substantially a strip hole. The insertion interface 137 includes a plurality of end walls 1371 that are opposite to one another. A stepped resisting groove 1373 is recessed on each end wall 1371 (as shown in FIG. 5). The resisting groove 1373 includes a first resisting portion 1375 and a second resisting portion 1377 communicating with the first resisting portion 1375. The first resisting portion 1375 is positioned adjacent to the top surface 133 and the second resisting portion 1377 is away from the top surface 133 of the sidewall 13. A diameter of the first resisting portion 1375 is greater than that of the second resisting portion 1377. A resisting surface 1379 is further formed on each end wall 1371 and is inclined from each end wall 1371. The resisting surface 1379 is positioned between the first resisting portion 1375 and the second resisting portion 1377 (referring to both FIGS. 5 and 6).

A receiving groove 1331 is defined on the top surface 133 corresponding to the insertion interface 137. The receiving groove 1331 includes a first receiving portion 1332 and two second receiving portions 1334 positioned on two ends of the first receiving portions 1332. A width of the first receiving portion 1332 is greater than that of the second receiving portions 1334. The depth of the first receiving portion 1332 is less than that of each of the second receiving portions 1334. A mounting hole 1335 is defined through each end of a bottom of the first receiving portion 1332. The mounting holes 1335 communicate with the insertion interface 137. Two guiding holes 1337 are further formed apart from each other in the bottom of the first receiving portion 1332 and are positioned between the two mounting holes 1335. In other embodiments, the number of the guiding holes 1337 is configured according to the need of the actual specific applications.

Also referring to FIG. 7, the connector assembly 30 of the embodiment is shown. The connector assembly 30 includes a connecting member 31 and a connector 35. The connecting member 31 is fixed in the receiving groove 1331 and extends into the insertion interface 137. The connector 35 is received in the insertion interface 137. The part of the connecting member 31 extending into the insertion interface 137 is electrically connected with the connector 35. In the illustrated embodiment, the connector 35 is a female connector.

The connecting member 31 is made of metallic conductive material. The connecting member 31 includes a main body 313, two connecting ends 315 and two positioning ends 317. The shape and structure of the main body 313 is corresponding to the shape and structure of the first receiving portion 1332. The main body 313 is received in the first receiving portion 1332. Two protrusions 3131 are protruded from one side surface of the main body 313, and are distanced from each other. Each protrusion 3131 is engaged with the corresponding guiding hole 1337. The two connecting ends 315 are connected to opposite ends of the main body 313. Heights of the connecting ends 315 are greater than that of the main body 313, respectively. Each connecting end 315 is received in the corresponding second receiving portion 1334. The structure and shape of the connecting end 315 is corresponding to the structure and shape of the second receiving portion 1334. A plurality of mounting grooves 3151 (as shown in FIG. 3) are formed on the side surface deviating from the protrusions 3131 of each main body 313. A circular fastening hole 3153 (as shown in FIG. 3) is formed on a bottom of the mounting groove 3151 to position a fastener (not shown).

Two stepped positioning ends 317 protrude from the side surface of the main body 313, which is defining the protrusions 3131, and are positioned adjacent to the connecting ends 315. Each positioning end 317 passes through the corresponding mounting holes 1335. Each positioning end 317 is used for positioning the connecting member 31 during assembly and electrically connecting with the connector 35 in use.

Each positioning end 317 includes a connecting portion 3171 and a positioning portion 3173. The connecting portion 3171 is connecting with the main body 313 at one end. The connecting portion 3171 is partially received in the first resisting portion 1375 and resists against a sidewall of the first resisting portion 1375. The positioning portion 3173 is connected with the connecting portion 3171 away from the main body 313. The positioning portion 3173 is received in the second resisting portions 1377 and resists against a sidewall of the second resisting portion 1377 for convenient positioning of the connecting member 31 during assembly thereof. A size of the connecting portion 3171 is greater than that of the positioning portion 3173. A triangular contacting block 3175 is extending from one end of the positioning portion 3173 to connect with the connecting portion 3171. The contacting block 3175 resists against the resisting surface 1379. The connecting member 31 may be made by a stamping process.

The connector 35 is received in the insertion interface 137 above the connecting portion 3171. The connector 35 resists between the two positioning portions 3173. In other embodiment, the number of the connector assemblies 30 is designed and configured according to the real-life actual desired application, the number of the insertion interfaces 137 and the receiving grooves 1331 correspond to the number of the connector assemblies 30.

In assembly, the connecting member 31 is positioned in the receiving groove 1331. Then the protrusions 3131 are received in the guiding holes 1337, and the positioning ends 317 pass through the mounting holes 1335 and extend into the insertion interface 137. The connecting portion 3171 is partially received in the first resisting portion 1375 and resists against the sidewall of the first resisting portion 1375. The positioning portion 3173 is partially received in the second resisting portion 1377 and resists against the sidewall of the second resisting portion 1377. The contacting block 3175 resists against the resisting surface 1379. The connector 35 is inserted into the insertion interface 137. The cover 20 finally covers the housing 10.

In use, a male connector of an external electronic device is coupled with the connector 35 for data transmitting between the connected electronic devices.

Each protrusion 3131 of the connecting member 31 is received in the corresponding guiding hole 1337. The connecting portion 3171 is partially received in one first resisting portion 1375 and resists against the sidewall of the first resisting portion 1375. The positioning portion 3173 is partially received in one second resisting portion 1377 and resists against the sidewall of the second resisting portion 1377. Therefore, it is convenient for positioning the connecting member 31 in the electronic device 100 during assembly. The connecting member 31 is stopped from become loosening during use. The connector 35 is steady positioned and resists between the two positioning ends 317. The male connector of the external device is easy to couple with the connector 35 in use.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a housing comprising a bottom wall and a sidewall extending from the edges of the bottom wall, the sidewall comprising an outer side surface, a top surface and an inner side surface, at least one insertion interface defined through the outer side surface and the inner side surface, a resisting groove defined on an end wall of the insertion interface, the top surface forming at least one receiving groove communicating with the corresponding insertion interface; and
   at least one connector assembly comprising:
      a connecting member comprising a main body received in the receiving groove and two positioning ends protruding from the main body, each positioning end passing through the receiving groove and extending into the insertion interface to resist a side wall of one resisting groove; and
      a connector received in the insertion interface and resisting between the two positioning ends.

2. The electronic device of claim 1, wherein each positioning end comprises a connecting portion and a positioning portion, the connecting portion is connected with the main body at one end, the positioning portion is connected with the connecting portion away from the main body, the resisting groove comprises a first resisting portion, the first resisting portion is positioned adjacent to the top surface, the connecting portion is partially received in the first resisting portion and resists against a sidewall of the first resisting portion.

3. The electronic device of claim 2, wherein the resisting groove further comprises a second resisting portion connected with the first resisting portion, the positioning portion is partially received in the second resisting portion and resists against a sidewall of the second resisting portion, the connector resists between the two resisting portions.

4. The electronic device of claim 3, wherein a diameter of the first resisting portion is greater than the diameter of the second resisting portion.

5. The electronic device of claim 2, wherein the positioning end further comprises a contacting block, the contacting block is extending from one end of the positioning portion to connect with the connecting portion.

6. The electronic device of claim 5, wherein the end wall further comprises a resisting surface, the resisting surface is positioned between the first resisting portion and the second resisting portion, the resisting surface resists the contacting block.

7. The electronic device of claim 1, wherein the main body further comprises at least one protrusion, the at least one protrusion is protruded from one side surface of the main body, at least one guiding hole is defined through a bottom of the receiving groove, each protrusion is received in the corresponding guiding hole.

8. The electronic device of claim 1, wherein the connecting member further comprises two connecting ends positioned at opposite ends of the main body, each connecting end is positioned adjacent to one positioning end, the receiving groove comprises first receiving portion and two second receiving portions positioned at two ends of the first receiving portions, a mounting hole is defined through each end of the bottom of the first receiving portion, the main body is received in the first receiving portion, each connecting end is receive in one second receiving portion, each positioning end passes through one mounting hole.

9. The electronic device of claim 8, wherein a width of the main body is greater than the width of the connecting ends, the width of the first receiving portion is greater than the width of the second receiving portion.

10. The electronic device of claim 9, wherein a height of the main body is less than the height of the connecting ends, the depth of the first receiving portion is less than the depth of the second receiving portion.

* * * * *